United States Patent
Appel-Oudenaar

(10) Patent No.: US 11,330,091 B2
(45) Date of Patent: May 10, 2022

(54) APPARATUS WITH HANDHELD FORM FACTOR AND TRANSPARENT DISPLAY WITH VIRTUAL CONTENT RENDERING

(71) Applicant: Dylan Appel-Oudenaar, North Hollywood, CA (US)

(72) Inventor: Dylan Appel-Oudenaar, North Hollywood, CA (US)

( * ) Notice: Subject to any disclaimer, the term of this patent is extended or adjusted under 35 U.S.C. 154(b) by 0 days.

(21) Appl. No.: 16/919,524

(22) Filed: Jul. 2, 2020

(65) Prior Publication Data
US 2022/0006888 A1    Jan. 6, 2022

(51) Int. Cl.
H04M 1/02    (2006.01)
H04N 9/31    (2006.01)
G06F 3/042    (2006.01)

(52) U.S. Cl.
CPC .......... *H04M 1/0272* (2013.01); *G06F 3/042* (2013.01); *H04N 9/3173* (2013.01)

(58) Field of Classification Search
CPC ..... H04M 1/0272; H04N 9/3173; G06F 3/042
See application file for complete search history.

(56) References Cited

U.S. PATENT DOCUMENTS

| | | | |
|---|---|---|---|
| 8,197,072 B2 | 6/2012 | Kwon et al. | |
| 10,197,803 B2 | 2/2019 | Badiali et al. | |
| 2009/0036158 A1 | 2/2009 | Fujinawa et al. | |
| 2012/0170002 A1* | 7/2012 | Ouderkirk | H04N 9/3173 353/30 |
| 2013/0286053 A1 | 10/2013 | Fleck et al. | |
| 2015/0097810 A1* | 4/2015 | Aoki | H01L 27/323 345/174 |
| 2017/0277356 A1* | 9/2017 | Hsieh | G06F 3/042 |
| 2018/0067315 A1* | 3/2018 | Amitai | G02B 27/0081 |
| 2019/0155035 A1 | 5/2019 | Amitai | |

FOREIGN PATENT DOCUMENTS

| | | |
|---|---|---|
| CN | 209265083 U | 8/2019 |
| DE | 102018002772 A1 | 10/2018 |
| JP | 2009533951 A | 9/2009 |

(Continued)

OTHER PUBLICATIONS

Bohn, D., "Intel Made Smart Glasses That Look Normal," The Verge, Feb. 5, 2018, 20 pages, retrieved from URL https://www.theverge.com/2018/2/5/16966530/intel-vaunt-smart-glasses-announced-ar-video.

(Continued)

*Primary Examiner* — Alexander Eisen
*Assistant Examiner* — Kebede T Teshome
(74) *Attorney, Agent, or Firm* — Cozen O'Connor

(57) ABSTRACT

A device having a hand-held form factor (e.g., smartphone, tablet computer) has a transparent display that allows viewing of real world content through the display, while rendering virtual content to the display. The display may take the form of a touch-sensitive display, allowing user input directly through physical interaction with the display. The display may include a pair of major outer-most faces and a pair of inner faces, one of the inner faces angled to reflect light from a projector, outward via one of the major outermost faces. The gap may advantageously be formed via a pocket extending inwardly from an edge of an optical substrate that comprise the touch-sensitive display.

20 Claims, 2 Drawing Sheets

(56) References Cited

FOREIGN PATENT DOCUMENTS

| KR | 100798991 B1 | 1/2008 |
|---|---|---|
| KR | 20160029390 A | 3/2016 |
| WO | 2011106797 A1 | 9/2011 |
| WO | 2019154429 A1 | 8/2019 |

OTHER PUBLICATIONS

""Plessey and WaveOptics Announce Strategic Partnership Using MicroLED Display Technology for Smart Glasses"", PRNewswire, Feb. 4, 2020, 3 pages, URL https://www.prnewswire.com/news-releases/plessey-and-waveoptics-announce-strategic-partnership-using-microled-display-technology-for-smart-glasses-300999022.html.

* cited by examiner

APPARATUS WITH HANDHELD FORM FACTOR AND TRANSPARENT DISPLAY WITH VIRTUAL CONTENT RENDERING

BACKGROUND

Technical Field

The present disclosure generally relates to apparatus having handheld form factors, for example smartphones or tablet computers, and to a transparent display that allows the real world to be viewed through the display while virtual content is rendered thereto.

Description of the Related Art

A large variety of processor-based devices are commercially available. These processor-based devices may take the form of computers (e.g., desktop, laptop or notebook, tablet computers), smartphones, or even head-worn displays. Head-worn displays typically provide either a virtual reality environment or an augmented reality environment. For example, virtual reality rendering head-worn displays provide images of virtual content, simulating a two- or three-dimensional world, typically without the real world being visible. Also for example, augmented reality head-worn displays allow the wearer to see the real world while also perceiving virtual content rendered in a field of vision of the wearer, often imposed on or otherwise spatially associated with objects in the real world. Head-worn displays typically allow for two or three different types of user input. For example, some head-worn displays include buttons or sensors, typically positioned on the earpieces or temples, which the wearer physically touches to provide input. Also for example, some head-worn displays employ gesture input, typically using cameras or other similar sensors to detect finger and/or hand gestures made by the wearer. As a further example, some head-worn displays employ gaze tracking, using cameras or other similar sensors to detect the gaze of the wearer, for example allowing the wearer to provide input by gazing at virtual content rendered in the wearer's field of vision.

Smartphones have recently been used to provide virtual reality and in some case a hybrid form of virtual and augmented reality. Again, in a purely virtual reality environment, the real world is not typically visible, the user seeing only the virtual content presented via the display of the smartphone. In the hybrid for, a portion of the real world is captured by a camera of the smartphone and presented via the display of the smartphone, along with presentation of virtual content. An example of such is the popular game POKEMON GO®. For smartphones, the display is typically touch-sensitive, and the user typically provides input via physically touching the touch-sensitive display screen.

Improvements in apparatus to provide augmented reality experiences are desirable, particularly hand-held form factor apparatus such as smartphones and tablet computers.

BRIEF SUMMARY

A device having a hand-held form factor (e.g., smartphone, tablet computer) has a transparent display that allows viewing of real world content through the display, while rendering virtual content to the display. The display may take the form of a touch-sensitive display, allowing user input directly through physical interaction with the display. The display may include a pair of major outer-most faces and a pair of inner faces, one of the inner faces angled to reflect light from a projector, outward via one of the major outer-most faces. The gap may advantageously be formed via a pocket extending inwardly from an edge of an optical substrate that comprise the touch-sensitive display.

A device having a hand-held form factor may be summarized as including: a frame; at least one optic mounted within the frame, at least one optic having a first major outer-most face and a second major outer-most face, the second major outer-most face parallel to and opposed to the first major outer-most face across a thickness of the at least one optic, the at least one optic having a first inner face and a second inner face, the first and the second inner faces spaced between the first and the second outer-most faces, the second inner face spaced from the first inner face by a gap, the second inner face non-parallel with respect to the first and the second outer-most faces, the at least one optic transparent to light incident on at least one of the first major outer-most face or the second major outer-most face at a first set of angles relative to the respective one of the first or the second major outer-most faces, the second inner face reflective of light incident thereon at a second set of angles relative to the second inner face; and a projector mounted within the frame, the projector positioned and oriented to either directly or indirectly project images incident onto the second inner face of the at least one optic at one or more angles of the second set of angles.

The at least one optic may comprise a touch-sensitive optical substrate that includes the first major outer-most face, the second major outer-most face, and a pocket that extends inwardly from an edge of the touch-sensitive optical substrate, where the pocket is delineated by the first and the second inner faces. The at least one optic may comprise a single touch-sensitive optical substrate that includes the first major outer-most face, the second major outer-most face, and a pocket in the single touch-sensitive optical substrate, where the pocket is delineated by the first and the second inner faces. The at least one optic may take the form of a single single-piece construction touch-sensitive optical substrate that includes the first major outer-most face, the second major outer-most face, and a pocket in the single single-piece construction touch-sensitive optical substrate, where the pocket is delineated by the first and the second inner faces.

Alternatively, the at least one optic may comprise a first optical substrate that includes the first major outer-most face and the first inner face, and a second optical substrate that includes the second major outer-most face and the second inner face, the gap which extends between the first inner face of the first optical substrate and the second inner face of the second optical substrate, the frame which holds the second optical substrate in spaced relationship to the first optical substrate.

The first major outer-most face may be flat and the second major outer-most face may be flat. The first inner face may flat, the second inner face may be flat, and the second inner face may angled with respect to the first inner face.

The first major outer-most face may be flat, the second major outer-most face may be flat, and the second inner face may be flat and may be angled with respect to the first and the second major outer-most faces at an angle within the second set of angles from approximately 1 degree to approximately 8 degrees. The first major outer-most face may be flat, the second major outer-most face may be flat, the first inner face may be flat, and the second inner face may be flat and may be angled with respect to the first inner face at an angle within the second set of angles from approximately 1 degree to approximately 8 degrees.

A largest one of the angles of the second set of angles may be smaller than a smallest one of the angles of the first set of angles.

The device may be a smartphone or a tablet computer.

The projector may be a non-laser based projector. The projector may comprise a two-dimensional array of light emitters.

A device having a hand-held form factor may be summarized as including: a housing; a touch-sensitive optical substrate coupled to the housing, the touch-sensitive optical substrate optical substrate having a first planar major outer-most face, a second planar major outer-most face, a peripheral edge that extends between the first and the second planar major outer-most faces about at least a portion of a periphery of the touch-sensitive optical substrate optical substrate, and a pocket that extends inwardly into the touch-sensitive optical substrate from a portion of the peripheral edge, the pocket delineated by a first planar inner face and a second planar inner face, the second planar major outer-most face parallel to and opposed to the first planar major outer-most face across a thickness of the touch-sensitive optical substrate, the second planar inner face spaced from the first planar inner face by a gap, the second planar inner face which extends at an acute angle with respect to the first and the second planar outer-most faces, the at least one optic transparent to light incident on at least one of the first or the second planar major outer-most faces, the second planar inner face reflective of light incident thereon at a defined set of angles relative to the second planar inner face; and a projector mounted to the housing, the projector positioned and oriented to either directly or indirectly project images incident onto the second planar inner face of the touch-sensitive optical substrate at one or more angles of the defined set of angles.

The touch-sensitive optical substrate may include two or more layers including at least one layer of electrodes.

The defined set of angles may include angles from approximately 1 degree to approximately 8 degrees.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with processor-based devices including smartphones, tablet computers, notebook computers, and processor-based "whiteboards" and/or communications components have not been shown or described in detail to avoid unnecessarily obscuring descriptions of the embodiments. In other instances, methods and techniques for generating augmented reality content and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1A:
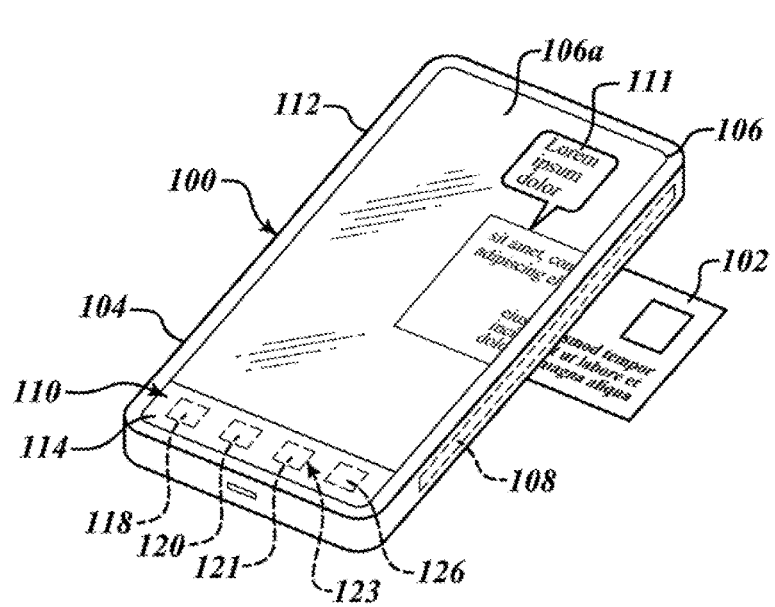
FIG. 1A is an isometric view of a device having a handheld form factor in the form of a smartphone, with a piece of media illustrated which is visible through a touch-sensitive display of the device, along with some virtual content rendered via the touch-sensitive display, according to at least one implementation.
Figure 1B:
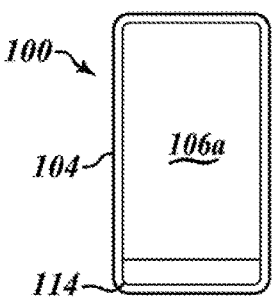
FIG. 1B is a front plan view of the device of FIG. 1A, without the piece of media or virtual content illustrated, according to at least one implementation.
Figure 1C:
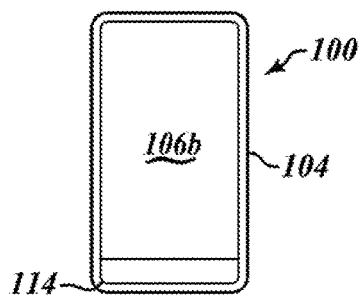
FIG. 1C is a rear plan view of the device of FIG. 1A, without the piece of media or virtual content illustrated, according to at least one implementation.

FIGS. 1A, 1B and 1C show a device having a hand-held form factor in the form of a smartphone 100, according to at least one illustrated implementation. The smartphone 100 is illustrated in FIG. 1A juxtaposed with an object in a real world environment in the form of a piece of media 102.

The smartphone 100 includes a frame 104, at least one optic 106 mounted within the frame 104, a projector 108 mounted within the frame 104, and circuitry 110 mounted within the frame 104. Notably, the optic 106 of the smartphone 100 is transparent, thus the piece of media 102 is visible through the smartphone. Additionally, the optic is operable to render virtual content 111, for instance rendered spatially associated with the piece of media 102. The virtual content 111 can take a large variety of forms, and may represented information that identifies or otherwise characterizes the object in the real world environment.

The frame 104 may take any of a large variety of forms, for example a rectangular band of metal or plastic. The frame 104 may form a housing 112 or portion of a housing to retain the various components, e.g., optic(s) 106, projector 108, and/or circuitry 110. In some implementations the frame 104 may provide environmental and/or shock protection to one or more components. The frame 104 may include a bezel 114, for example to encompass edges of the optic 106. Part of the bezel 114 may house a least a portion of the circuitry 110 that is not typically transparent. While generally illustrated as being arrayed along a short side or length of the frame 104, some or all of the circuitry may be arrayed along a long side or length of the frame 104, for instance housed in a channel formed by opposed portions of the frame 104.

In some implementations, the frame 104 may comprise a metal frame or band, for instance a stainless steel, titanium, and/or aluminum frame or metal. The frame 104 may optionally include an outer covering spaced outwardly of the metal frame or band, for example a silicone covering, which may advantageously reduce slippage. The frame 104 may optionally include a resilient inner sleeve or barrier, for example a silicone sleeve or barrier, that may advantageously provide shock resistance to protect the internal components in event of fall. The resilient inner sleeve or barrier may be placed between the metal frame or band and the optics, resilient supporting the optics in the metal frame or band. In this respect, a portion of the frame 104 may extend slight above and below the optics to provide protection during falls and to protect against scratches.

The at least one optic 106 has a first major outer-most face 106a and a second major outer-most face 106b. The first and the second major outer-most faces 106a, 106b may be substantially planar or flat (i.e., macroscopically planar). The second major outer-most face 106b may be parallel to and opposed to the first major outer-most face 106a across a thickness 116 (FIGS. 4 and 5) of the at least one optic 106.

The projector 108 may be housed by the frame 106 and positioned and oriented to either directly or indirectly project images toward at least a portion of the optic 106, as explained in more detail with reference to FIGS. 3 and 4, below. The projector 108 may take a variety of forms, but preferable is non-laser based. For example, the projector 108 may take the form of a two-dimensional array of light emitters, for example a two-dimensional array of light emitting diodes (LEDs) or micro-LEDs. The two-dimensional array of light emitting diodes (LEDs) or micro-LEDs may be elongated, having one dimension substantially larger than the other dimension. The two-dimensional array of light emitting diodes (LEDs) or micro-LEDs may be arrayed along a major axis of the smartphone, for example along a longest edge thereof.

Some implementations may include two or more projectors 108. For example, a first projector 108 which extends along a first side of the smartphone 100 and a second projector (not shown in FIG. 1A) which extends along a side of the smartphone 100, the second side diametrically opposed to the first side across a centerline of the smartphone 100. This may be particularly advantageous where a relatively small thickness of the smartphone 100 limits the smaller dimension of the two-dimensional array of light emitting diodes (LEDs) or micro-LEDs, and the total number of pixels realizable along the smaller dimension would otherwise be insufficient to render content across the width of the display. Thus, the first projector 108 only needs to render content for one half of the entire display, and the second projector only needs to render content for the other half of the display. The virtual content can be adjusted or generated to account for any foreshortening resulting from differences in distance between the projector and the particular point of incidence on the optic 106. Other forms of projectors 108 may be employed.

Circuitry 110 may take a large variety of forms. The circuitry 110 may, for example, include one or more processors 118, system memory 120, radio(s) or modem(s) 121 and associated antenna(s) 123, power sources (e.g., secondary battery cells, super-capacitor cells, fuel cells, photovoltaic arrays), power converters or inverters, communications ports, and system bus (not shown) that couples various system components including the system memory 120 to the processor(s) 118. The processor 118 will at times be referred to in the singular herein, but this is not intended to limit the embodiments to a single processor, since in certain embodiments, there will be more than one processor (e.g., microprocessor, graphics processor). Non-limiting examples of commercially available systems include, but are not limited to, ARM processors from a variety of manufactures, SnapDragon microprocessors from Qualcomm, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 118 may be any logic processing unit, such as one or more central processing units (CPUs), microprocessors, digital signal processors (DSPs), application-specific integrated circuits (ASICs), field programmable gate arrays (FPGAs), etc.

The system bus (not shown) can employ any known bus structures or architectures, including a memory bus with memory controller, a peripheral bus, and a local bus. Some embodiments may employ separate buses for data, instructions and power.

The system memory 120 includes read-only memory ("ROM") 122 and random access memory ("RAM") 124. A basic input/output system ("BIOS") can be stored in the ROM 122, and contains basic processor-executable routines that help transfer information between components, such as during start-up.

The circuitry 110 may also include one or more solid state memories, for instance Flash memory or solid state drive (SSD) 126, which provides nonvolatile storage of computerreadable instructions, data structures, program modules and other data executable by the processor(s) 118.

The radio(s) or modem(s) 121 and associated antenna(s) 123 may take any of a large variety of forms, e.g., cellular radios, WI-FI radios, Bluetooth radios, operable to establish wired or wireless communications over a communications channel (e.g., networks, for instance the Internet or cellular networks). Other wired and/or wireless communications ports or interfaces may be employed.

Figure 2:
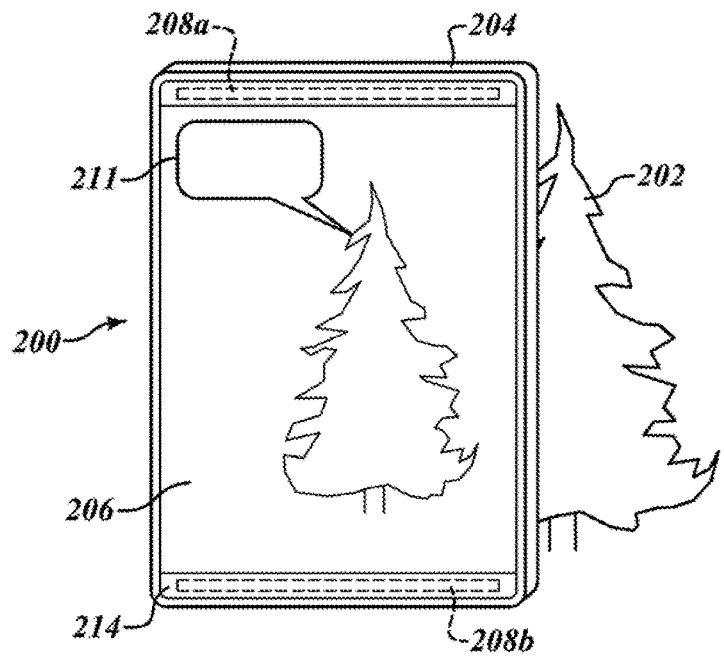
FIG. 2 is an isometric view of a device having a handheld form factor in the form of a tablet computer, with a portion of the real world illustrated which is visible through a touch-sensitive display of the device, along with some virtual content rendered via the touch-sensitive display, according to at least one implementation.

FIG. 2 shows a device having a hand-held form factor in the form of a tablet computer 200, according to at least one illustrated implementation. The tablet computer 200 is illustrated in FIG. 1A juxtaposed with an object in a real world environment in the form of a tree 202.

The tablet computer 200 includes a frame 204, at least one optic 206 mounted within the frame 204, a first projector 208a mounted within the frame 204, a second projector 208b mounted within the frame 204, and circuitry (not visible) mounted within the frame 204 behind a bezel 214. Notably, the optic 206 of tablet computer 200 is transparent, thus the tree 202 is visible through the tablet computer 200. Additionally, the optic 206 is operable to render virtual content 211, for instance virtual content 211 rendered spatially associated with the tree 202. The virtual content 211 can take a large variety of forms, and may represented information that identifies or otherwise characterizes the object in the real world environment.

The first projector 208a may extend along a first end of the tablet computer 200, for instance under a first bezel 214a. The second projector 208b may extend along a second end of the tablet computer 200, for instance under a second bezel 214b, the second side diametrically opposed to the first side across a centerline of the tablet computer 200. This may be particularly advantageous where a relative small thickness of the tablet computer 200 limits the smaller dimension of the two-dimensional array of light emitting diodes (LEDs) or micro-LEDs, and the total number of pixels realizable along the smaller dimension would otherwise be insufficient to render content across the entire length of the display. Thus, the first projector 208a only needs to render content for one half of the entire display, and the second projector 208b only needs to render content for the other half of the display. The virtual content 211 can be adjusted or generated to account for any foreshortening resulting from differences in distance between the projectors 208a, 208b and the particular point of incidence on the optic 206. Other forms of projectors 208a, 208b may be employed. In some implementations, four or more projectors may be employed, for example one along each edge of the tablet computer 200.

The various components of the tablet computer 200 are similar or even identical to those described above with respect to the smartphone 100. Such discussion will not be repeated in the interest of brevity.

Figure 3:
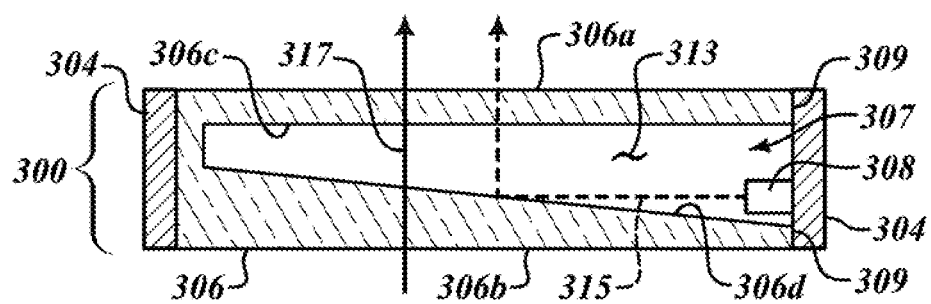
FIG. 3 is a sectional view of a device having a handheld form factor with an optic comprising a single single-piece construction touch-sensitive optical substrate that includes a first major outer-most face, a second major outer-most face, and a pocket in the single single-piece construction touch-sensitive optical substrate, where the pocket is delineated by a first inner face and a second inner face, separated from one another by a gap, the second inner face angled with respect to at least one of the first or the second major outer-most faces, according to at least one implementation.

FIG. 3 is a sectional view of a device 300 having a handheld form factor with a frame 304 and an optic comprising a single single-piece construction touch-sensitive display optical substrate 306, according to at least one implementation.

The single single-piece touch-sensitive display optical substrate 306 can take any of a variety of forms, for example capacitive touch-sensitive displays, resistive touch-sensitive displays surface acoustic wave (SAW) touch-sensitive displays, optical imaging touch-sensitive displays, or acoustic pulse recognition touch-sensitive displays. The single single-piece construction touch-sensitive display optical substrate 306 may include one or more optical components, for example glass, acrylic, synthetic ruby or other light transmissive materials, with or without coatings (e.g., dielectrics), optical filters, transparent electrically conductive traces, transparent resistive coatings, transparent capacitive coatings, etc.

The single single-piece construction touch-sensitive display optical substrate 306 includes a first major outer-most face 306a, a second major outer-most face 306b, and a pocket 307. As discussed in detail below with reference to FIG. 5, the single single-piece construction touch-sensitive display optical substrate 306 may include two or more distinct layers. The pocket 307 may extend inwardly from an edge 309 of the touch-sensitive optical display substrate 306 at a periphery of the touch-sensitive optical display substrate 306. The pocket 307 in the single single-piece construction touch-sensitive optical substrate 306 is delineated by a first inner face 306c and a second inner face 306d. The first inner face 306c and a second inner face 306d may be substantially planar or flat (i.e., macroscopically planar). The first inner face 306c and a second inner face 306d are separated from one another by a gap 313. The size of the gap 313 may vary (e.g., linearly), for example tapering or flaring from one end of the pocket 307 to the other end of the pocket 307. The second inner face 306d is angled, preferably at an acute angle, with respect to at least one of the first or the second major outer-most faces 306a, 306b, and optionally with respect to the first inner face 306c. The angle may, for instance, be in a range of from approximately 1 degree to approximately 8 degrees (the angle in the drawings is not necessarily in proportional). Typically, a largest one of the angles of the second set of angles is smaller than a smallest one of the angles of the first set of angles.

In some implementations, the projector(s) 308 projects virtual content in the form of images directly into the pocket 307, to be incident at an acute angle on the second inner face 306d, where the virtual content is reflected outward toward the user as indicated by arrow 315. In other implementations, the projector(s) 308 projects virtual content in the form of images indirectly into the pocket 307 to be incident at an acute angle on the second inner face 306d, for example via one or more mirrors, reflectors, and/or prisms (not shown). As noted above, virtual content may be adjusted to account or accommodate and foreshortening resulting from difference distances between the projector and the point of incidence. Where two or more projectors 308 are employed, the second inner face 306d may have a peaked or ^-shaped profile, for example angled upward from a left or top side toward a centerline, and angled upward from a right or bottom side toward the centerline. That way, each projector 308 projects virtual content (e.g., images) at a respective angled portion of the second inner face 306d to produce a desired reflection outwards of the first or second outer-most major face 306a, 206b.

The single single-piece construction touch-sensitive display optical substrate 306 is transparent to light incident on at least one of the first major outer-most face 306a or the second major outer-most face 306b at a first set of angles relative to the respective one of the first or the second major outer-most faces 306a, 306b, as indicated by arrow 317. Thus, a user holding the smartphone 100 (FIGS. 1A-1C) or tablet computer 200 (FIG. 2) can see objects (e.g., piece of media 102 in FIG. 1A) in a portion of the real world through the display (i.e., single single-piece construction touch-sensitive optical substrate 306). The second inner face 306d is reflective of light incident thereon at a second set of angles relative to the second inner face 306d, for instance in a range of from approximately 1 degree to approximately 8 degrees. Thus, virtual content rendered by a projector 308 may be reflected by the second inner face 306d, outwardly through the first outer-most major face 306a, again as indicated by arrow 315. In contrast to hybrid displays, the user is seeing the actual objects in the real world, not visual representations of the actual objects. The single single-piece construction touch-sensitive display optical substrate 306 may have an optical power of zero.

The single single-piece construction touch-sensitive display optical substrate 306 provides a unitary structure that fixes the position and orientation of the first major outer-most face 306a, the second major outer-most face 306b, the first inner face 306c, and the second inner face 306d with respect to one another, and thus may provide a more robust structure than, for example a multi-component optics, for example the structured described below with reference to FIG. 4.

Figure 4:
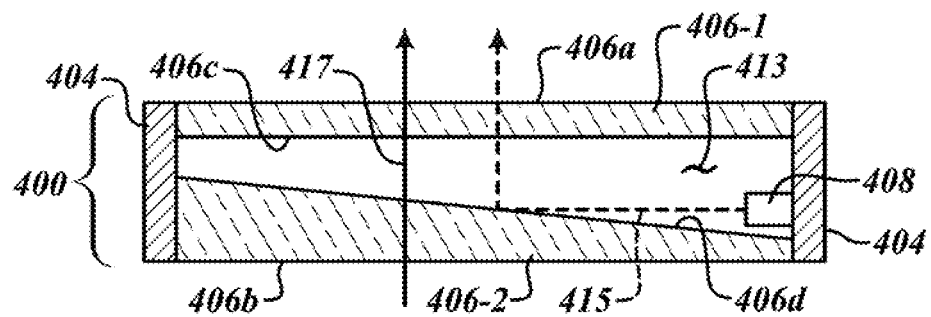
FIG. 4 is a sectional view of a device having a handheld form factor with an optic comprising a touch-sensitive optical display that includes a first optical substrate that includes a first major outer-most face and a first inner face, and a second optical substrate that includes a second major outer-most face and a second inner face, a gap which extends between the first inner face of the first optical substrate and the second inner face of the second optical substrate, the frame which holds the second optical substrate in spaced relationship to the first optical substrate, according to at least one implementation.

FIG. 4 is a sectional view of a device 400 having a handheld form factor with a frame 404 and an optic comprising a touch-sensitive optical display 406 that includes a first optical display substrate 402-1 and a second optical display substrate 402-2, distinct from the first optical display substrate 406-1, according to at least one implementation.

The touch-sensitive optical display 406 may include one or more optical components, for example glass, acrylic, synthetic ruby or other light transmissive materials, with or without coatings (e.g., dielectrics), optical filters, transparent electrically conductive traces, transparent resistive coatings, transparent capacitive coatings, etc.

The first optical display substrate 406-1 includes a first major outer-most face 406a and a first inner face 406c. The second optical display substrate 406-2 includes a second major outer-most face 406b and a second inner face 406d. The frame 404 holds the second optical display substrate 406-2 in spaced relationship to the first optical display substrate 406-1 with a gap 413 which extends between the first inner face 406c of the first optical display substrate 406-1 and the second inner face 406d of the second optical display substrate 406-2.

In some implementations, the projector(s) 408 projects virtual content in the form of images directly into the gap 413, to be incident at an acute angle on the second inner face 406d, where the virtual content is reflected outward toward the user as indicated by arrow 415. In other implementations, the projector(s) 408 projects virtual content in the form of images indirectly into the gap 413 to be incident at an acute angle on the second inner face 406d, for example via one or more mirrors, reflectors, and/or prisms (not shown). As noted above, virtual content may be adjusted to account or accommodate and foreshortening resulting from difference distances between the projector and the point of incidence. Where two or more projectors 408a, 408b are employed, the second inner face 406d may have a peaked or ^-shaped profile, for example angled upward from a left or top side toward a centerline, and angled upward from a right or bottom side toward the centerline. That way, each projector 408a, 408b projects virtual content (e.g., images) at a respective angled portion of the second inner face 406d to produce a desired reflection outwards of the first or second outer-most major face 406a, 406b.

The touch-sensitive display 406 is transparent to light incident on at least one of the first major outer-most face 406a or the second major outer-most face 406b at a first set of angles relative to the respective one of the first or the second major outer-most faces 406a, 406b as indicated by arrow 417. Thus, a user holding the smartphone 100 (FIGS. 1A-1C) or tablet computer 200 (FIG. 2) can see objects (e.g., piece of media 102 in FIG. 1A) in a portion of the real world through the display. The second inner face 406d is reflective of light incident thereon at a second set of angles relative to the second inner face 406d, for instance in a range of from approximately 1 degree to approximately 8 degrees. Thus, virtual content rendered by a projector 408 may be reflected by the second inner face 406d, outwardly through the first outer-most major face 406a, again as indicated by arrow 415. In contrast to hybrid displays, the user is seeing the actual objects in the real world, not visual representations of the actual objects. The touch-sensitive display 402 may have an optical power of zero.

Figure 5:
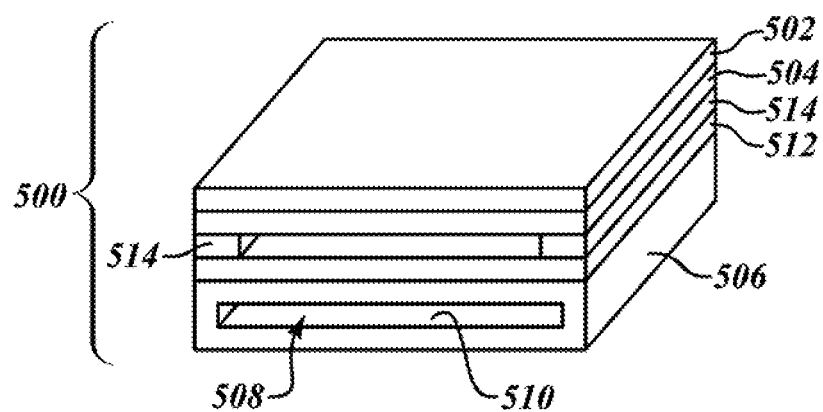
FIG. 5 is an isometric view of a single single-piece construction touch-sensitive optical display that includes multiple layers, including at least one layer of electrodes, according to at least one implementation.

FIG. 5 is an isometric view of a single single-piece construction touch-sensitive optical display substrate 500 that employs resistive touch-sensitive technology which includes multiple layers (e.g., including at least one layer of electrodes), according to at least one implementation.

The single single-piece construction touch-sensitive optical display substrate 500 includes a top film (e.g., PET) 502. A resistive coating 504 is carried on bottom or inward facing surface of the top film 502.

The single single-piece construction touch-sensitive optical display substrate 500 includes a bottom glass 506. The bottom glass 506 may include a pocket 508 formed therein, delineating a pair of inner faces (only one visible) 510. A resistive coating 512 is carried on a top or inward facing surface of the bottom glass 506.

One or more spacers 514 may space the top film 502 and resistive coating 504 from the bottom glass 506 and resistive coating 512. Force applied to the top film 502 can bring the two resistive coatings 504, 512 into contact with each other, which is detected as a signal on or across electrodes.

Each of the elements of FIG. 5 may advantageously be transparent (e.g., transparent conducting oxides) to visible light, allowing viewing through the touch-sensitive optical display substrate 500.

Various changes can be made to the embodiments in and implementations in light of the above-detailed description.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. A device having a hand-held form factor, comprising:
    a frame;
    at least one optic mounted within the frame, the at least one optic having a first major outer-most face and a second major outer-most face, the second major outer-most face parallel to and opposed to the first major outer-most face across a thickness of the at least one optic, the at least one optic having a first inner face and a second inner face, the first and the second inner faces spaced between the first and the second outer-most faces, the second inner face spaced from the first inner face by a gap in the at least one optic, the second inner face non-parallel with respect to the first and the second outer-most faces, the at least one optic transparent to light incident on at least one of the first major outer-most face or the second major outer-most face at a first set of angles relative to the respective one of the first or the second major outer-most faces, the second inner face reflective of light incident thereon at a second set of angles relative to the second inner face; and
    a projector mounted within the frame, the projector positioned and oriented to either directly or indirectly project images incident onto the second inner face of the at least one optic at one or more angles of the second set of angles.

2. The device of claim 1 wherein the at least one optic comprises a touch-sensitive optical substrate that includes the first major outer-most face, the second major outer-most face, and a pocket that extends inwardly from an edge of the touch-sensitive optical substrate, where the pocket is delineated by the first and the second inner faces.

3. The device of claim 1 wherein the at least one optic comprises a single touch-sensitive optical substrate that includes the first major outer-most face, the second major outer-most face, and a pocket in the single touch-sensitive optical substrate, where the pocket is delineated by the first and the second inner faces.

4. The device of claim 1 wherein the at least one optic is a single single-piece construction touch-sensitive optical substrate that includes the first major outer-most face, the second major outer-most face, and a pocket in the single single-piece construction touch-sensitive optical substrate, where the pocket is delineated by the first and the second inner faces.

5. The device of claim 1 wherein the at least one optic comprises a first optical substrate that includes the first major outer-most face and the first inner face, and a second optical substrate that includes the second major outer-most face and the second inner face, the gap which extends between the first inner face of the first optical substrate and the second inner face of the second optical substrate, the frame which holds the second optical substrate in spaced relationship to the first optical substrate.

6. The device of claim 1 wherein the first major outer-most face is flat, the second major outer-most face is flat.

7. The device of claim 1 wherein the first inner face is flat, the second inner face is flat, and the second inner face is angled with respect to the first inner face, and the at least one optic has an optical power of zero.

8. The device of claim 1 wherein the first major outer-most face is flat, the second major outer-most face is flat, and the second inner face is flat and is angled with respect to the first and the second major outer-most faces at an angle within the second set of angles from approximately 1 degree to approximately 8 degrees.

9. The device of claim 1 wherein the first major outer-most face is flat, the second major outer-most face is flat, the first inner face is flat, and the second inner face is flat and is angled with respect to the first inner face at an angle within the second set of angles from approximately 1 degree to approximately 8 degrees.

10. The device of claim 1 wherein a largest one of the angles of the second set of angles being smaller than a smallest one of the angles of the first set of angles.

11. The device of claim 1 wherein the device is a smartphone.

12. The device of claim 1 wherein the projector is a non-laser based projector.

13. The device of claim 1 wherein the projector comprises a two-dimensional array of light emitters.

14. A device having a hand-held form factor, comprising:
a housing;
a touch-sensitive optical substrate coupled to the housing, the touch-sensitive optical substrate optical substrate having a first planar major outer-most face, a second planar major outer-most face, a peripheral edge that extends between the first and the second planar major outer-most faces about at least a portion of a periphery of the touch-sensitive optical substrate optical substrate, and a pocket that extends inwardly into the touch-sensitive optical substrate from a portion of the peripheral edge, the pocket delineated by a first planar inner face and a second planar inner face, the second planar major outer-most face parallel to and opposed to the first planar major outer-most face across a thickness of the touch-sensitive optical substrate, the second planar inner face spaced from the first planar inner face by a gap, the second planar inner face which extends at an acute angle with respect to the first and the second planar outer-most faces, the at least one optic transparent to light incident on at least one of the first or the second planar major outer-most faces, the second planar inner face reflective of light incident thereon at a defined set of angles relative to the second planar inner face; and
a projector mounted to the housing, the projector positioned and oriented to either directly or indirectly project images incident onto the second planar inner face of the touch-sensitive optical substrate at one or more angles of the defined set of angles.

15. The device of claim 14 wherein the touch-sensitive optical substrate includes two or more layers including at least one layer of electrodes.

16. The device of claim 14 wherein the defined set of angles include angles from approximately 1 degree to approximately 8 degrees.

17. The device of claim 14 wherein the device is a smartphone.

18. The device of claim 14 wherein the device is a tablet computer.

19. The device of claim 14 wherein the projector is a non-laser based projector.

20. The device of claim 14 wherein the projector comprises a two-dimensional array of light emitters.

* * * * *